March 29, 1966 W. F. SMITH 3,243,487
METHOD AND APPARATUS FOR HEAT SEALING THERMOPLASTIC FILMS
Filed Aug. 14, 1962 3 Sheets-Sheet 1

INVENTOR
WILLARD FRED SMITH
BY E. Janet Berry
ATTORNEY

March 29, 1966   W. F. SMITH   3,243,487
METHOD AND APPARATUS FOR HEAT SEALING THERMOPLASTIC FILMS
Filed Aug. 14, 1962   3 Sheets-Sheet 2
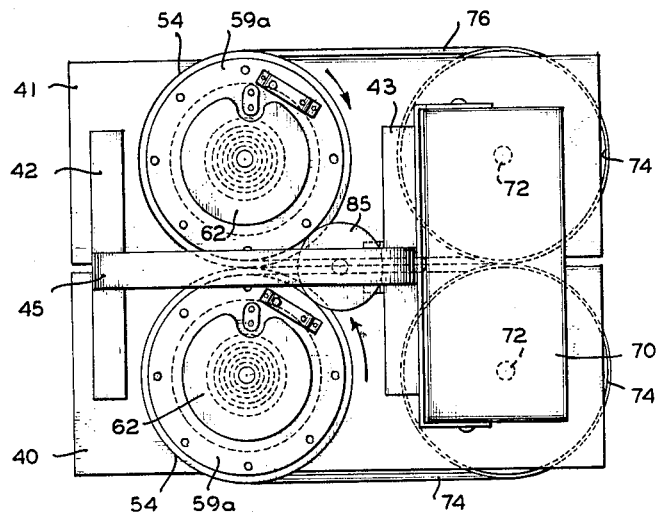
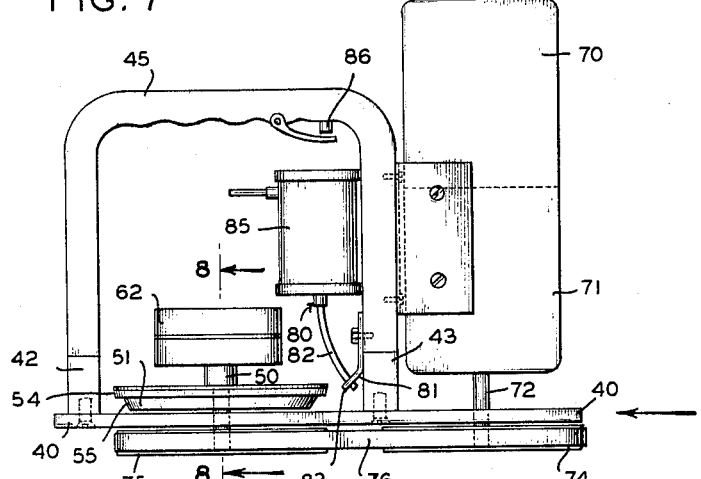
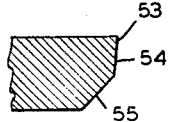
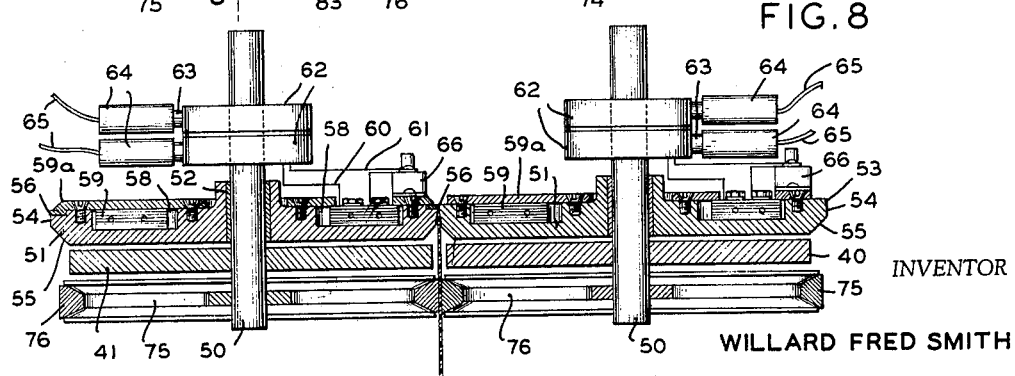
INVENTOR
WILLARD FRED SMITH
BY *E. Janet Berry*
ATTORNEY

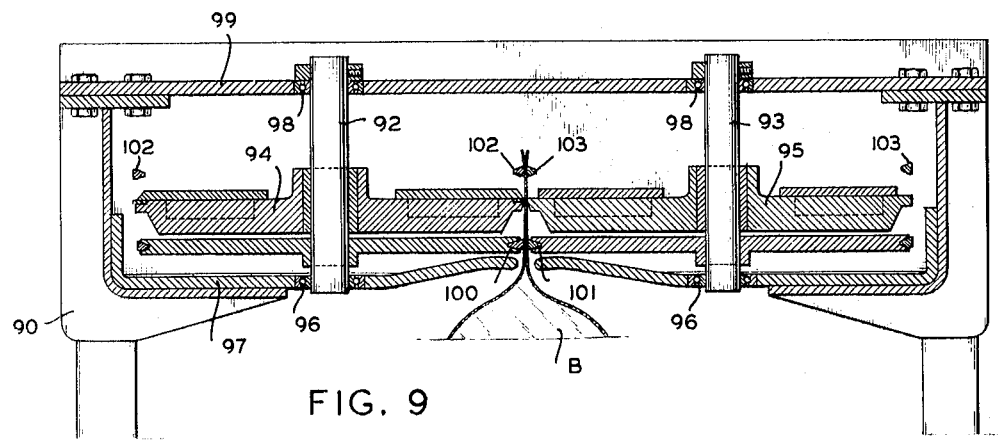
FIG. 9
FIG. 10
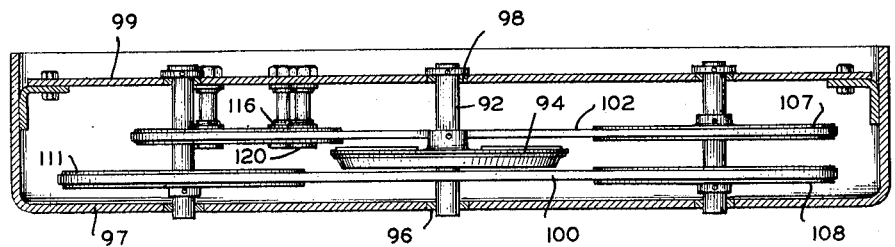
FIG. 11
INVENTOR
WILLARD FRED SMITH
BY E. Janet Berry
ATTORNEY

United States Patent Office 3,243,487
Patented Mar. 29, 1966

3,243,487
METHOD AND APPARATUS FOR HEAT SEALING THERMOPLASTIC FILMS
Willard F. Smith, Newark, N.Y., assignor to National Distillers and Chemical Corporation, New York, N.Y., a corporation of Virginia
Filed Aug. 14, 1962, Ser. No. 216,848
28 Claims. (Cl. 264—248)

The present invention relates to a method and apparatus for heat sealing thermoplastic films. The invention particularly relates to a method and apparatus adapted to unite the adjoining edge portions of two or more thermoplastic sheets initially disposed in substantially, parallel edge aligned relation. In such a method and apparatus, the invention specifically contemplates the formation of a sealed closure between two layers of a thermoplastic material forming opposite sides of a container or bag.

Thermoplastic materials inherently have relatively sharp melting points, and exhibit the characteristic of low heat conductivity. These characteristics make it difficult to unite two or more laminated sheets of the material by compression between the surfaces of heated sealing bars or platens in the procedures conventionally followed. Particular difficulty is experienced when such procedures are applied to film sheets having a gauge of above about 4 mils. With films above such gauge, the pressure and temperature required to soften the film material sufficiently to obtain a bond in which the film layers are merged and united by fusion of the material of the film layers not only increases sealing time, but also tends to cause deterioration of the film material. The extended heating period also results in excessive crystallization of the thermoplastic material. This in turn produces brittleness in the material at the joint and destroys the elastic properties of the joint required to prevent rupture as a result of impact strains.

In addition, using ordinary procedures, it is difficult to produce uniform and reliable seals in bag filling operations, where dusty or powdered materials are packed. In such operations it is nearly impossible to avoid leaving a residue of dust or powder on the opposed film surfaces to be sealed. This contamination by package contents not only tends to insulate the web, whereby to prevent uniform transmission of heat but also interposes a barrier to homogeneous fusion of the web material in the seal area.

It is an object of the present invention to provide a sealing method adapted to produce a seal wherein the opposed marginal edges of two or more webs of thermoplastic material are united by melting the web material along a relatively narrow line of contact between the webs thus causing the molten material to flow together to form a homogeneous, fused junction of the marginal edges in the immediate vicinity of initial contact thereof.

It is also an object of the invention to provide a method wherein the marginal edges of two or more webs are passed through a narrowly restricted forming zone, wherein, under applied heat and pressure, overlying portions of the marginal edges are melted and flow together as a substantially homogeneous, shaped joint between said webs.

It is a further object of the present invention to provide a sealing method adapted to provide a substantially homogeneous, fused seal between the marginal edges of adjoining walls of a bag structure in the presence of films or coatings of dusty or powdery materials comprising portions of the contents of such bag. In addition, the present invention contemplates the provision of apparatus particularly adapted for carrying out the method described.

In the method according to the present invention the marginal edges of two or more layered sheets of a thermoplastic material are progressively compressed between the opposed surfaces of a pair of heated platens which provide a progressively narrowed, heated forming zone in immediate proximity to the compressive platen surfaces. As compressed between the platen surfaces, the marginal edge portions are melted and the molten thermoplastic material flows into the forming zone, and between the layered sheets. As the molten material flows from the first zone into and through the adjacent portions of the forming zone, it is subjected to a gradual reduction in pressure as the distance from the boundary, defined by the intersection of the first zone and the forming zone, to a particular portion of molten material in the forming zone increases. In the forming zone, the material is compressed and shaped, along with the sheet material in said zone, to form a substantially homogeneous, fused, seamless junction of the marginal edges of the layered sheets.

The invention and its objects may be understood more fully from the following description, taken in conjunction with the accompanying drawings wherein:

FIG. 6 is a plan view of an alternate form of the apparatus contemplated by the present invention, adapted for use as a portable unit;

FIG. 7 is a side elevational view of the device of FIG. 6;

FIG. 8 is a sectional view taken on the line 8—8 of FIG. 7;

FIG. 8A is an enlarged detail view illustrating the rim or edge portion of one of the sealing disks;

FIG. 9 is a sectional view illustrating a further modification of the invention;

FIG. 10 is an elevational view, partly in section, taken at right angles to FIG. 9; and FIG. 11 is a reduced schematic perspective illustrating the operation of the modification of FIGS. 9 and 10.

Figure 1:
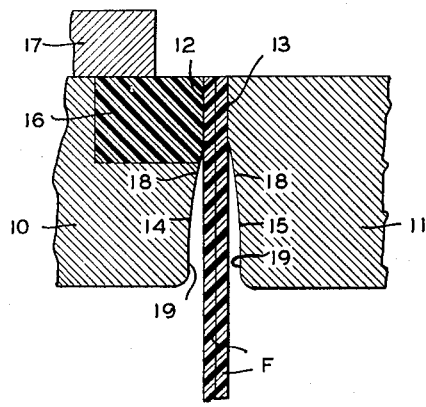
FIG. 1 is a cross-sectional view illustrating the contact edges of two sealing platen members substantially at the initial point of contact with the marginal edges of two layered webs of a thermoplastic material.
Figure 2:
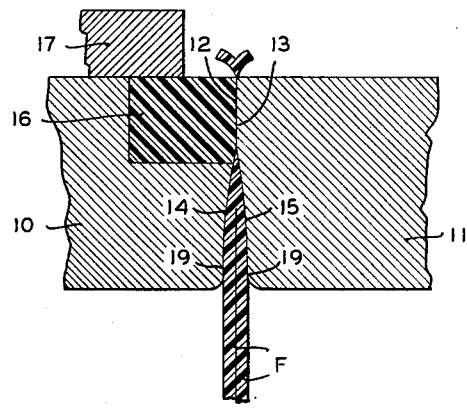
FIG. 2 is a similar view of the sealing platen edges shown in FIG. 1 at the final point of contact thereof.

With further reference to the drawings, there is illustrated in FIGURES 1 and 2 a fragmentary enlargement of sealing bar members indicating their operation in forming a seal. The bar members 10 and 11 are illustrated forming a seal in the juxtaposed layers of film F therebetween. The bar members have flat contact areas 12 and 13 at their upper portions and chamfered or beveled surfaces 14 and 15 adjacent thereto.

As indicated on the drawings, the layers of film to be sealed are positioned between the bars 10 and 11, which have been brought to sealing temperature by any suitable heating means (not shown), and the latter are then moved into the position illustrated in FIGURE 2 wherein the contacting edges 12 and 13 are in engagement. This results in heating the film disposed between the bars, the portion between the contacting surfaces 12 and 13 being immediately melted, while that in the narrower portion of the apex between the chamfered surfaces 14 and 15 is more gradually melted, the film tending to flow from the narrower portion of the apex outwardly, under pressure the heat decreasing with distance away from the apex. In effect, the molten film is extruded from between the surfaces 12 and 13, as shown by arrows in the drawing. The result is that in the region between the tapering surfaces the film fuses and rapidly forms a substantially homogeneous mass in which any foreign material such as dust is coated and does not prevent the formation of a satisfactory seal.

In order to eliminate the wear which would result from the constant engagement of the contacting surfaces 12 and 13, and to eliminate film sticking therebetween, one of such surfaces includes an insert 16 such as Teflon or the like, which is set into the sealing bar 10 and retained by a bar-like holder 17.

In the embodiment shown, the chamfered surfaces 14 and 15 are formed by smooth concave curves which have their initial portions 18 near the apex at approximately a 5° angle and become substantially parallel at their remote areas 19.

Various dimensions and angles of the sealing bars may be employed, depending upon the size and characteristics of the film. For example, using relatively thick film such as 10 mils, the gap between the surfaces 19 may be .020", the height of the contacting areas 12 and 13 may be .062", and the total width of the bars approximately .187".

Figure 4:
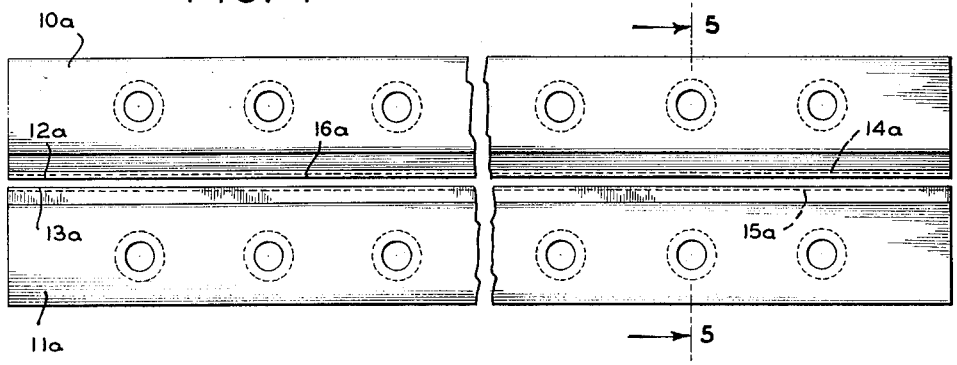
FIG. 4 is a top plan view of a modified form of platens somewhat similar to those illustrated in FIGS. 1 and 2.
Figure 5:
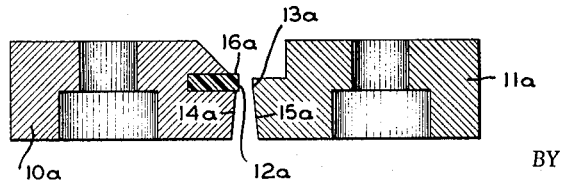
FIG. 5 is a sectional view taken on the line 5—5 of FIG. 4.

Instead of forming the chamfered surfaces curved as described hereabove, these may be formed substantially straight as illustrated in FIGURES 4 and 5, the bars 10 and 11a shown being approximately ⅜" wide, the contacting surfaces 12a and 13a having a width of .062", and the chamfered surfaces 14a and 15a a width of ³⁄₁₆", with an angle of bevel of approximately 5°, resulting in a separation or gap of about .020" when the contact surfaces are brought together.

FIGURES 4 and 5 also illustrate the adaptation of chamfered seal surfaces to a bar-type seal device. Bar-type sealing devices are well known in the art, but are limited to intermittent, stepwise operations. By employing sealing surfaces according to the present invention, however, such bar-type devices may be rendered more effective.

Figure 3:
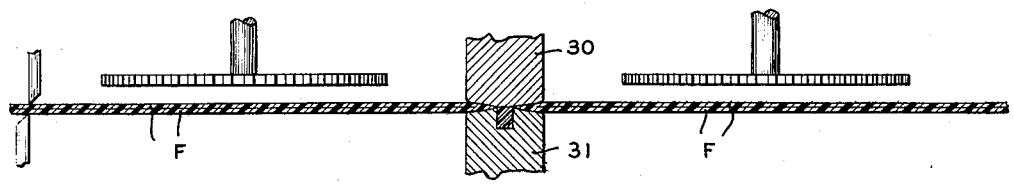
FIG. 3 is a diagrammatic view illustrating an assembly for continuously sealing the marginal edge portions of the opposed sides of previously filled bag units employing sealing and forming platens in accordance with the present invention.

Instead of forming only a single seal, it is contemplated that a double seal may be formed by a pair of double beveled sealing bars 30 and 31, as indicated in FIGURE 3. In such an arrangement the film material which is initially positioned between the contacting surfaces flows into the apices of the chamfered surfaces formed on each side of the bars 30 and 31.

In the event that flash or scrap remains attached to the sealed edges in the embodiment of the invention illustrated in FIGURES 1 and 2, it may be removed by a suitable cutter (not shown). Similarly, with the double sealing members 30 and 31 of FIGURE 3, should the sealed edges be connected across the region engaged by the contacting portions of the sealing bars, these may be separated or severed by suitable cutting means (not shown).

It will be understood that various stackers, cutters and the like, commonly known in this art, may be employed with the sealing bars which have been described hereabove.

Whereas the previously described embodiment of the invention has included substantially flat or straight bars which are supported for motion toward and away from each other, thereby providing an intermittent sealing operation, the invention also contemplates a method of continuous sealing wherein the seal is formed by disc-shaped members. Thus, with reference to FIGURES 6 through 8, there is illustrated a frame comprising parallel supporting plates or bars 40 and 41 held in spaced relation by U-shaped cross frame members 42 and 43 which maintain the plates 40 and 41 in coplanar relationship. In order that the unit may be readily portable, a U-shaped handle 45 is provided, the extremities thereof being secured to the central portions of the U-shaped members 42 and 43.

Rotatably mounted on each of the plates 40 and 41 is a shaft 50 on which a disc 51, preferably insulated from the shaft by a collar of insulating material 52, is mounted. These discs have at their upper extremities relatively narrow contacting surface portions 53, chamfered portions 54 between which the seal is formed, and a lower portion widely beveled as indicated at 55. One of the discs has an anvil 56 comprising a ring of suitable material such as Teflon.

Mounted interiorly of the recess 58 in the disc is a heating element 59 having electrical leads 60 and 61. The heating element and the anvil are held in place by a retainer plate 59a secured by suitable screws or the like. The leads 60 and 61 are connected to slip rings 62 mounted on the shaft 50 and engaged by brushes 63 mounted in holders 64 and connected by leads 65 to a suitable source of power. A thermostat 66 may be mounted on the discs and connected in one of the leads 61 for controlling the energization of the heating element to maintain a desired controlled temperature.

Mounted on a side of the handle is an electric motor 70 connected to a speed reducer and gear box 71 which drives a spaced pair of parallel shafts 72. Each of the shafts is rotatably mounted adjacent the ends of the plates 40 and 41 and on the opposite extremity thereof has a fixed pulley 74. The shafts 50 on which the discs are mounted have pulleys 75 attached on the extremities depending beneath the plates 40 and 41 and coplanar with the pulleys 74. The pulleys 74 and 75 which are mounted on a pair of shafts on each of the plates 40 and 41 have belts 76, the opposed pairs of belts engaging along the line of travel just beneath the space separating the plates 40 and 41.

If desired, a film scrubber 80 may be mounted by a bracket 81 on the plates 40 and 41 and an air hose 82 secured by a holder 83 on the bracket 81 may be provided. The hose 82 is connected to a suitable source of air pressure (not shown).

Air pressure may be controlled by a valve operated by a valve operated by a solenoid 85 mounted upon the handle 45. A switch 86, also secured to the handle, may control the circuitry to the motor, to the solenoid and to the heaters for the sealing discs.

In operation, bags are introduced with their ends to be sealed projecting between the belts 76, whereby the belts convey the bags past the film scrubber and into engagement between the discs, thereby forming a seal.

FIGURES 9 through 11 illustrate a further modification of the invention. In this embodiment a framework 90 supports spaced disc shafts 92 and 93 on which sealing discs 94 and 95 are mounted. The discs and their mounting on the shafts are similar to that already described and hence no further discussion should be required. Shafts 92 and 93 are mounted in roller bearings 96 in the sealer bed 97, the upper ends of the shafts being mounted in bearings 98 in the upper framework member 99.

The present form of the invention contemplates the conveying means engaging and holding spaced portions of the film above and below the portion engaged by the sealing discs. Thus, the bag B is supported and conveyed by cooperating lower belts or chains 100 and 101 and by upper belts or chains 102 and 103 spaced above the lower conveyor. Intermediate the upper and lower conveyors the sealing discs 94 and 95 engage the bag to form a seal.

In order to drive the conveying members there is provided a pair of double pulleys or sprockets 105 and 106 having upper and lower driving members 107 and 108 and mounted on shafts 109 and 110. The shafts 92 and 93 are driven by suitable means (not shown). On the opposite side of the discs 94 and 95 is another pair of sprockets or pulleys 111 and 112 mounted on shafts 113 and 114. It will be understood that the pulley shafts are rotatably mounted on the frame members in any suitable manner.

The pulleys or sprockets 111 and 112 are mounted in the same plane as the lower sprocket 108 in order that the chains or belts 100 and 101 may be carried thereby.

In order that the upper conveyors 102 and 103 may discharge scrap formed above the seal to one side, the conveyors 102 and 103 are arranged for side discharge. In order to accomplish this, guide sprockets or pulleys 116 and 117 are positioned as indicated in FIGURE 11 for carrying the conveyor 103, and guide sprockets or pulleys 119, 120, 121 and 122 are positioned as indicated for carrying the conveyor 102, pulleys 120 and 121 urging the conveyors 102 and 103 toward each other. It will be understood that the guide sprockets or pulleys are rotatably mounted on shafts carried by portions of the sealer framework as previously described.

In the operation of the device just described, bags are placed between the upper and lower sets of conveyors, as shown in FIGURE 11, which support the upper end of the bag at positions above and below the sealing discs 94 and 95. The bag is then conveyed between the sealing discs, thereby forming a seal. The sealed bag is discharged at the outer end of conveyors 100 and 101 and the scrap is discharged to the side at the upper ends of conveyors 102 and 103.

While several forms of the invention have been shown and described, as well as the novel method of sealing accomplished thereby, it will be understood that various further modifications may be made therein by those skilled in this art. For example, the bars 30 and 31 of FIGURE 3 may be made in the circular form of the discs 51 shown in FIGURE 8. If such circular bars are mounted there on horizontal shafts and rotated while the film web is drawn between them, a continuous seal-and-sever operation may be performed. Such an operation may be employed where superposed layers of film are to be divided longitudinally to produce two or more continuously edge sealed portions from the initial feed of layered material. Therefore, the invention is not considered limited by that which is shown in the drawings and described in the specification, and reference therefore is had to the claims for summaries of the novel features of construction, novel combinations of parts, and novel sealing method, for all of which protection is desired.

What is claimed is:

1. A method of forming a sealed juncture between layered sheets of a thermoplastic material along the edges thereof, comprising applying heat and pressure to said sheets in a first narrowly defined area, bounded by said edges and extending between opposite side edge portions of said sheets, sufficient to melt and to strike through the material thereof; extruding all of the molten sheet material from said area, under said applied pressure, and at least partially into a second narrowly defined area of said sheets, coextensive with said first area and next adjoining area; simultaneously applying heat and pressure to said sheet material in said second area, sufficient at least substantially to soften said sheet material; and under said applied pressure, in said second area, molding said sheets and molten material to form a substantially homogeneous, fused seal strip common to said layered sheets.

2. A method according to claim 1, wherein the heat applied to said sheets in each said first and second areas is substantially uniform throughout said areas, and above the melting point of said sheet material.

3. A method according to claim 1, wherein the pressure applied to said sheets in said second area decreases uniformly from a line common to the boundary between said first and second areas to a parallel line delineating the opposite boundary of said second area.

4. A method according to claim 1, wherein said thermoplastic material is polyethylene.

5. A method according to claim 1, wherein said first and second narrowly defined areas are coextensive with and substantially common to the open end of a layered tubular web of said thermoplastic material.

6. A method according to claim 1, wherein at least one of said layered sheets has a gauge above about 4 mils.

7. A method according to claim 1, wherein said layered sheets are disposed in a substantially vertical plane.

8. A method according to claim 1, wherein said layered sheets are disposed in a substantially horizontal plane.

9. A method of forming a sealed juncture between the marginal edges of aligned, layered sheets of a thermoplastic material, comprising subjecting a first area of said sheets, bounded by and coextensive with said edges, to heat and pressure sufficient to melt said sheet material and to extrude all of the molten material out of said first area and at least partially into a second area next adjacent to said first; simultaneously subjecting said sheet material to heat in said second area under a gradually reduced pressure, in a direction away from said first area; and while reducing pressure molding said heated thermoplastic sheet material in said second area to form a fused seal strip, wherein the thermoplastic material of said layered sheet marginal edges is substantially homogeneously combined.

10. A method of forming a sealed juncture between the marginal edges of aligned layered sheets of a thermoplastic material, comprising simultaneously applying heat and pressure to a narrowly defined portion of said edges within two contiguous laterally defined zones; in a first of said zones, bounded by said edges, melting said material, and extruding all of said melted material out of said first zone and at least partially into the second zone; heating the thermoplastic material of said marginal edge portions in said second zone; and in said second zone combining said material portions to form a substantially homogeneous, fused seal strip uniting the marginal edges of said layered sheets.

11. A method of forming a fused seal between layered sheets of a thermoplastic material along the edges thereof, comprising introducing said sheets into a zone, bounded by said edges, between opposed surfaces of a pair of heated platens, together producing a striking area, bounded by said edges, and a molding area; compressing said sheets between said surfaces; melting and extruding all of said material from said striking area into said molding area; and molding said sheets and said molten material under pressure in said molding area to form a substantially homogeneous combination of said sheet material therein.

12. A method for forming a continuous sealed juncture between layered sheets of a thermoplastic material along the edges thereof, comprising passing said sheets through a melting zone, bounded by said edges, and a molding zone defined along a line extending at right angles to the direction of travel of said sheets; heating and compressing said sheets along said line; extruding all of said sheet material from said melting zone into said molding zone under applied pressure; and therein heating and compressing said sheet material and said molten sheet material into a substantially homogeneous, fused seal strip coextensive with said sheet travel path.

13. A method of forming a fused juncture between layered sheets of thermoplastic material along the edges thereof, comprising compressing said sheets along a narrowly defined first area thereof, bounded by said edges, heating said sheets in said first area to melt the material thereof, extruding all of the molten material from said area into a second area next adjoining and coextensive with said first area; heating said sheets in said second area at least to soften said material; and under pressure, molding said sheet material in said second area, forming a substantially homogeneous fused seal between the layered sheets in said area.

14. An apparatus for forming a fused juncture between opposed surfaces of layered sheets of thermoplastic material, comprising a pair of heated platens; corresponding edge portions on said respective platens, wherein each said edge portion includes similarly disposed contiguous contact and chamfered surface areas narrowly defined in said edge portion to have a common boundary therein and coextensive therewith; means for moving said platens to bring said respective contact surface areas of said platens into surface to surface contact relation; and means for heating said platens; said means for heating said platens in direct contact with said platens and heating each of said contiguous contact areas to a temperature sufficient to melt said layered sheets of thermoplastic material.

15. An apparatus according to claim 14, wherein said contact surface area in each platen is formed between two spaced parallel lines of definition, each line forming the common boundary with one of two chamfered surface areas separated by said contact surface area.

16. An apparatus according to claim 14, wherein said chamfered surface area in each said edge portion is a substantially flat area disposed in a plane angularly related to said contact surface area in the line of interacting pressure contact relation between said contact surface areas.

17. An apparatus according to claim 14, wherein said chamfered surface area in each said edge portion extends from said contact area boundary in a substantially smooth curve to terminate in a surface area of substantially parallel relation to the surface of said contact surface area.

18. An apparatus according to claim 14, wherein said contact surface area of one said platen edge portion comprises an inset strip of tetrafluoroethylene.

19. An apparatus for forming a fused juncture between opposed surfaces of layered sheets of thermoplastic material, comprising a pair of heated disc-like platens, each having an obverse and a reverse surface portion; corresponding edge portions peripherally of said respective platens wherein each said edge portion includes similarly disposed contiguous contact and chamfered surface areas narrowly defined in said edge portion to have a common boundary therein and to be coextensive therewith; means for rotatably mounting said disc-like platens for tangentially interengaging, surface to surface contact relation one to another through said respective edge portion contact surface areas; means for rotating said platens; and means for heating said platens.

20. An apparatus according to claim 19, wherein said platen mounting means comprises a pair of support shafts for said respective platens, disposed in parallel spaced relation substantially equal to the diameter of one said platen.

21. An apparatus for forming a fused juncture between opposed surfaces of layered sheets of thermoplastic material, comprising a support frame structure including a pair of support bar elements each having obverse and reverse surface portions, and corresponding leading and trailing ends, a pair of U-shaped cross frame elements individually secured to each of said bar elements in spaced relation longitudinally thereof, connecting said bar elements in aligned, spaced, substantially parallel, coplanar, edgewise relation, and an inverted U-shaped handle connecting said cross frame elements; a pair of heated disc-like platens, each having an obverse and a reverse surface portion; corresponding edge portions peripherally of said respective platens, wherein each said edge portion includes similarly disposed contiguous contact and chamfered surface areas narrowly defined in said edge portion to a common coextensive boundary intermediate said obverse and reverse surface portion; means, intermediate the ends of each support bar, for separately mounting said platens in interacting pressure contact to one another through their respective contact areas, and in common tangential relation to a plane extended between said support bars at right angles to the planes of said obverse and reverse surface portions of said bars and of said platens; means to hold the end edge portions of at least two layered sheets of thermoplastic material in surface contact along a line parallel to said reverse surface portions of said support bar elements; means for spreading said end edge portions in a narrowly defined area spaced from said obverse surface portions of said support bar elements, including means for introducing a fluid jet stream between said spread edge portions, disposed intermediate said platens and the leading ends of said bar elements; means for controlled heating of said platens; and common means for rotating said platens and for moving said holding means in a path common to said plane between said bar elements and in a direction from leading to trailing ends of said bar elements.

22. Apparatus according to claim 21, wherein said means to hold the end edge portions of said layered sheets of thermoplastic material comprises two pairs of pulleys wherein said pulleys are mounted for rotation in a common plane parallel to the reverse surface of said support bar elements, and from pair to pair two pulleys are respectively mounted in subsantially tangential relation to each other adjacent the trailing ends of said respective bar elements, and two pulleys are similarly mounted adjacent the leading edges thereof, and including in each pair of pulleys an endless belt movable over said paired pulleys.

23. An apparatus according to claim 22, wherein said pulleys mounted at the trailing ends of said respective bar elements are respectively substantially concentric with a corresponding platen and serially related thereto for linked rotation in spaced parallel planes.

24. An apparatus according to claim 22, wherein said means for rotating said platens, comprises a motor drive means mounted on said inverted U-shaped handle, and including a shaft drive for each of said pulleys which are adjacent to the leading ends of said support bar elements.

25. Sealing apparatus comprising a frame, a pair of sealing discs rotatably mounted on said frame, means for heating said discs, said discs being substantially coplanar and arranged with their uppermost edges in substantial surface to surface engagement, the profile of the edges having relatively flat contacting portions and chamfered portions adjacent thereto whose apex is formed at the line of contact between the flat portions, means for moving said sealing discs into substantial surface-to-surface engagement and means for conveying sheets of film to be sealed between the discs, said means for heating said discs in direct contact with said discs and heating each of said flat contacting portions to a temperature sufficient to melt said sheets of film.

26. Apparatus according to claim 25, in which the conveying means comprises flexible belts, spaced pairs of pulleys mounted fore and aft of said sealing discs and driving said belts, the belts having cooperating portions extending along a line tangential to the engaging periphery of said sealing discs.

27. Apparatus according to claim 26, in which said conveying means includes upper and lower conveyors spaced to hold film above and below the portion of the film received between the sealing discs.

28. Apparatus according to claim 27, in which the upper and lower conveyors are arranged with their discharging ends separated, whereby the film with the sealed end is discharged remotely from scrap carried by the upper conveyor.

References Cited by the Examiner

UNITED STATES PATENTS

| | | | |
|---|---|---|---|
| 2,679,469 | 5/1954 | Bedford | 156—580 |
| 3,017,315 | 1/1962 | Doyle | 156—581 |
| 3,020,186 | 2/1962 | Lawrence | 156—251 X |
| 3,115,564 | 12/1963 | Stacy | 156—251 X |
| 3,166,462 | 1/1965 | Schoder | 156—582 X |

EARL M. BERGERT, *Primary Examiner.*

HAROLD ANSHER, ALEXANDER WYMAN,
*Examiners.*